(12) United States Patent
Liotta et al.

(10) Patent No.: US 12,493,034 B2
(45) Date of Patent: Dec. 9, 2025

(54) REAGENT BUFFER

(71) Applicant: GEORGE MASON UNIVERSITY, Fairfax, VA (US)

(72) Inventors: Lance A. Liotta, Manassas, VA (US); Alessandra Luchini Kunkel, Manassas, VA (US); Marissa Ashton Howard, Manassas, VA (US); Amanda Haymond Still, Manassas, VA (US); Ghaliah Abdraboh M. Alluhaibi, Manassas, VA (US); Hannah Elizabeth Steinberg, Chicago, IL (US)

(73) Assignee: GEORGE MASON UNIVERSITY

( * ) Notice: Subject to any disclaimer, the term of this patent is extended or adjusted under 35 U.S.C. 154(b) by 1009 days.

(21) Appl. No.: 17/570,634

(22) Filed: Jan. 7, 2022

(65) Prior Publication Data
US 2022/0221454 A1 Jul. 14, 2022

Related U.S. Application Data

(60) Provisional application No. 63/135,524, filed on Jan. 8, 2021.

(51) Int. Cl.
| | |
|---|---|
| B01L 3/00 | (2006.01) |
| B01F 33/302 | (2022.01) |
| B01F 33/3033 | (2022.01) |
| B01L 7/00 | (2006.01) |
| B01L 9/00 | (2006.01) |
| B23D 53/00 | (2006.01) |
| B65G 47/80 | (2006.01) |
| B82Y 20/00 | (2011.01) |
| B82Y 30/00 | (2011.01) |
| B82Y 40/00 | (2011.01) |
| C12M 1/34 | (2006.01) |
| C12M 3/06 | (2006.01) |
| C12N 1/14 | (2006.01) |

(Continued)

(52) U.S. Cl.
CPC . *G01N 33/54393* (2013.01); *G01N 33/54388* (2021.08); *G01N 33/56983* (2013.01); *G01N 2333/165* (2013.01)

(58) Field of Classification Search
CPC ....... G01N 33/54393; G01N 33/54388; G01N 33/56983; G01N 2333/165
See application file for complete search history.

(56) References Cited

U.S. PATENT DOCUMENTS

| | | | |
|---|---|---|---|
| 5,773,212 A * | 6/1998 | Figard | G01N 33/54393 435/5 |
| 2017/0074874 A1* | 3/2017 | Hunter | G01N 33/54388 |
| 2021/0116376 A1* | 4/2021 | Swager | G01J 5/02 |

OTHER PUBLICATIONS

Greenfield, Norma J. "Using circular dichroism spectra to estimate protein secondary structure." Nature protocols 1.6 (2006): 2876-2890. (Year: 2006).*

* cited by examiner

*Primary Examiner* — Jennifer Wecker
*Assistant Examiner* — Oyeleye Alexander Alabi
(74) *Attorney, Agent, or Firm* — Raj S. Dave; Dave Law Group LLC

(57) ABSTRACT

An embodiment relates to a reagent buffer comprising a zwitterionic sulfonic solution, a non-ionic surfactant solution, and a buffer solution, wherein the reagent buffer has a pH range of about 7.0 to about 8.0 and a circular dichroism with an absorbance peak more than 0 at 190 nm and 225 nm. In an embodiment, the reagent buffer is configured to be a reagent buffer for a lateral flow immunoassay for detection of COVID-19.

27 Claims, 13 Drawing Sheets

(51) Int. Cl.
*C12N 1/20* (2006.01)
*C12Q 1/02* (2006.01)
*C12Q 1/6806* (2018.01)
*C12Q 1/6844* (2018.01)
*C12Q 1/6848* (2018.01)
*C12Q 1/686* (2018.01)
*C23C 2/00* (2006.01)
*G01N 15/10* (2024.01)
*G01N 15/14* (2024.01)
*G01N 15/1433* (2024.01)
*G01N 21/29* (2006.01)
*G01N 21/45* (2006.01)
*G01N 21/65* (2006.01)
*G01N 33/543* (2006.01)
*G01N 33/569* (2006.01)
*G01N 33/574* (2006.01)
*G01N 33/58* (2006.01)
*G02B 6/42* (2006.01)

REAGENT BUFFER

CROSS-REFERENCE TO RELATED APPLICATIONS

This application claims the benefit under 35 U.S.C § 119 of U.S. Provisional Application No. 63/135,524 filed on Jan. 8, 2021 titled as, "SARS COV-2 ANTIGEN LATERAL FLOW IMMUNOASSAY BUFFER", which is hereby incorporated by reference in its entirety.

FIELD OF THE INVENTION

This invention relates to a reagent buffer for a Lateral Flow Immunoassay (LFI). This invention is more particularly relates to a novel reagent buffer composition for rapid LFI COVID-19 antigen testing.

BACKGROUND OF INVENTION

Lateral flow immunoassays (LFI) are a versatile, rapid method of diagnosing a sample for a specific antigen of interest. Applications of this technology can be applied to both non-clinical and clinical settings. LFIs are increasingly used for the rapid diagnosis of infectious diseases with such as influenza, sexually transmitted diseases, and more recently SARS-CoV-2 or COVID-19.

A LFI is comprised of a sample pad that collects and transmits the tested sample to another pad that is immobilized with an affinity capture conjugated beads. These conjugate beads mix with the sample and bind to the antigens. The conjugate bead-sample mixture flows next to a reaction matrix, typically comprised of nitrocellulose or PVDF membrane that has biological molecules (antibodies or antigens) immobilized onto a testing region that is specific to the disease state being measure and binds the conjugate bead-sample mixture as it flows past. Conjugate bead, if bound to the sample, can bind to the test line as it flows past, and will be unable to bind the test line without the antigens also bound to the conjugate bead. Excess reagents are absorbed into a wicking pad at the end of the LFI strip.

A critical component of the LFI is the reagent buffer. A reagent buffer performs multiple tasks to ensure the LFI runs correctly. First, the reagent buffer prepares the sample for analysis by extracting the analyte of interest without denaturing the specific analyte-ligand binding sites required or the immunological reactivity. Next, the reagent buffer must properly re-hydrate the dry LFI strip to improve fluid flow rate performance. Additionally, the reagent buffer must rehydrate and mix the conjugate beads with the sample analyte. Finally, the reagent buffer, must prevent non-specific hydrophobic interactions on the reaction matrix to both improve the diagnostic signal and improve the clarity of the diagnostic signal (i.e. reduction of non-specific background signal).

The reagent buffer is typically comprised of surfactants/chemical detergents, blocking proteins, polymers, and other materials that interfere with hydrophobic binding. Examples of these chemicals include Triton X-100, Nonidet P40, bovine serum albumin, Tween 20. The exact relative concentrations of these materials differ for each LFI diagnostic test and analyte of interest.

We aimed to create a reagent buffer that can be utilized for rapid LFI antigen testing for SARS-CoV-2 virus. The SARS-CoV-2 virus generates thousands of copies of protein antigens per virus. These antigens are indicative of active infectious because the virus is replicating at high rates. Therefore, developing a reagent buffer which can extract and neutralize SARS-CoV-2 antigens from a sample and be applied to various downstream immunoassays is of high importance. Herein, we present a novel reagent buffer composition for rapid LFI COVID-19 antigen testing.

SUMMARY OF INVENTION

An embodiment relates to a reagent buffer comprising a zwitterionic sulfonic solution, a non-ionic surfactant solution, and a buffer solution, wherein the reagent buffer has a pH range of about 7.0 to about 8.0 and a circular dichroism with an absorbance peak more than 0 at 190 nm and 225 nm.

BRIEF DESCRIPTION OF THE FIGURES

FIG. 3 shows that HEPES combined with a non-ionic detergent (Tween 20) in phosphate buffer saline yields an improved LFI flow rate. As seen in FIG. 2, higher concentrations of HEPES yield poorer flow rates and LFI clarity (Sample 1), however flow rates can be improved with the addition of the non-ionic detergent (Tween 20) (Sample 2). Despite the improved flow rate at higher concentrations of HEPES, a 200 mM solution of HEPES is a better optimal maximum concentration that has reduced background and improved flow characteristics with or without Tween 20 either in water or low saline solution.

FIG. 4 shows the positive control testing of reagent buffer mixture. Positive control testing of reagent buffer mixture. As seen in FIG. 3, 2M HEPES with Tween yields a LFI response with poor wicking and flow rate (Sample 5). Additionally, the test line control band has reduced intensity. Testing with 200 mM HEPES with 1% Tween 20 in water yields a visible band with a faster wicking rate and reduced background (Sample 6), however, with the addition of a saline buffered solution, the test band intensity increases. The band thickness is higher in the solution with PBS added and flowed at the fastest rate of the set (Sample 7).

FIG. 6 shows that optimized reagent buffer that includes the zwitterionic sulfonic buffer with the non-ionic detergent yields a buffer that has improved flow characteristics, reduced background signal/non-specific binding, and improved band thickness and intensity.

FIG. 8 shows the concentration optimization of the zwitterionic sulfonic buffer. High concentrations of HEPES (500 mM-2M) damages the LFI to have poor wicking, increased background signal, and diminished positive test band thickness and intensity (2M HEPES). Low concentrations of HEPES (>100 mM) additionally, yields increased background signal. Therefore, the zwitterionic buffer component of the reagent buffer has an optimal LFI SARS-CoV-2 antigen testing.

Figure 9:
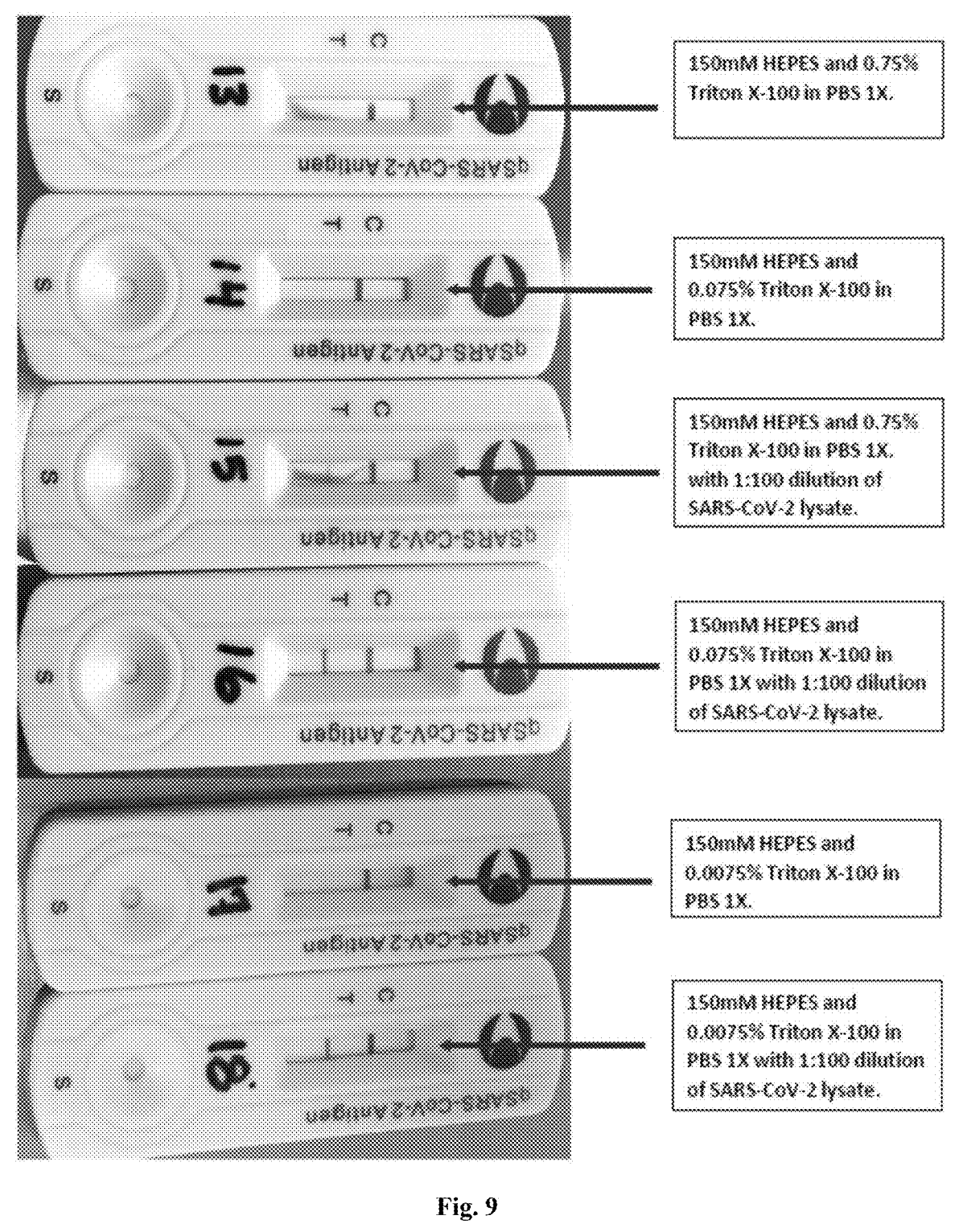

FIG. 9 shows the combination of a zwitterionic buffer with surfactant Triton X-100 demonstrates the narrow range for optimal LFI reagent buffer qualities. A 150 mM concentration of HEPES in PBS 1× was determined to be the best concentration between the determined ranges of 100-200 mM (above). The addition of the surfactant Triton X-100 at 0.75% demonstrated slow fluid flow wicking and poor conjugate bead mobilization, however lowering the concentration 10-fold led to an increased fluid flow rate and improved background signal. Running a positive control sample with the SARS-CoV-2 lysate had minimal background signal, but the test line band intensity and thickness was reduced. On the other hand, lowering the concentration of Triton X-100 by 100-fold has increased the non-specific background signal and narrow the band thickness.

FIG. 10 shows that an increase of HEPES concentration at 200 mM with surfactant Triton X-100 at 0.075% in PBS 1× showed a lighter band with a clear background. However, lowering the concentration of surfactant Triton X-100 10-fold led to increased non-specific background signals and narrow band thickness.

FIG. 11 shows that a combination of a zwitterionic buffer of 150 mM HEPES with 0.075% of surfactant Triton X-100 and 1% of non-ionic detergent (Tween 20) in phosphate buffer saline 1× demonstrates the acceptable LFI flow rate (sped up bead mobilization), reduced non-specific background signals, and improved band thickness and intensity. Accordingly, a positive control sample with the SARS-CoV-2 lysate has shown an optimal LFI SARS-CoV-2 antigen testing.

FIG. 12 shows that Reagent Buffer can be applied to other-SARS-CoV-2 antigen LFIs.

FIG. 13 shows that the final Reagent Buffer Mixture comparison with predicate SARS-CoV-2 antigen LFI buffer yields equivalent analytical sensitivity.

FIG. 14 shows circular dichroism spectroscopy readings of the Reagent Buffer compared to predicate SARS-CoV-2 antigen LFI Reagent Buffer demonstrates full equivalence. An average of N=3 runs per buffer yield an equivalence between the predicate and Mason Reagent buffer.

DETAILED DESCRIPTION

Definitions and General Techniques

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denotes the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

Figure 1:
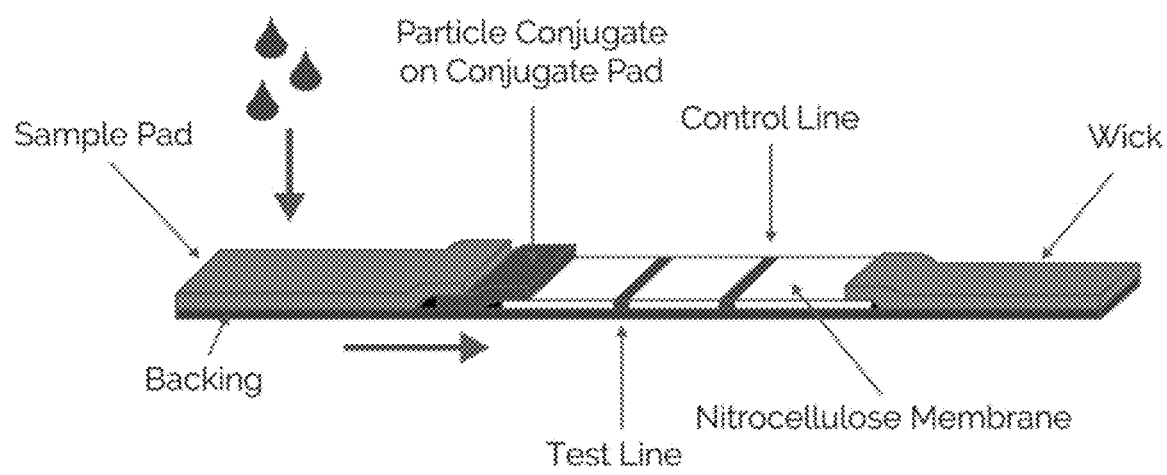
FIG. 1 shows a schematic representation of a Lateral Flow Immunoassay.

The term "Lateral Flow Immunoassay" as shown in FIG. 1 detects the presence of a target substance in a liquid sample without a need for specialized and costly equipment. It has other common names such as lateral flow test, lateral flow device, lateral flow assay, lateral flow immunochromatographic assay, Dipstick, Express test, pen-side test, quick test, Rapid test and Test strip.

The term "Buffer solution" is an aqueous solution including a mixture of a weak acid and its conjugate base, or a weak base and the conjugate acid of the weak base. The pH changes very little when a small amount of strong acid or base is added to it. Buffer solutions are used as a means of keeping pH at a nearly constant value.

Buffer solutions described herein may be applied to parts of a lateral flow apparatus as described herein to enhance performance of the apparatus. For example, a buffer solution may render a test apparatus and method as described herein compatible with liquids that contain components that otherwise would interfere with the analysis. Buffer solutions may also be used to slow liquid travel time across a membrane to ensure sufficient reaction time between any target analyte and a corresponding anti-analyte antibody or analyte-conjugate protein.

In an embodiment, buffer solutions described herein include salts, acids, proteins, excipients, viscosity modifiers, and/or surfactants. In this application, "buffer," "buffer solution," and "buffer formulation" may be used interchangeably to describe a solution comprising at least one buffering compound and water. Optionally, the buffer solution may further comprise buffer additives. Buffer additives are compounds that do not necessarily contribute to the buffering ability of the buffer solution (e.g., they do not substantially affect the acid-base chemistry of the buffer solution). In some embodiments, the buffering compounds may comprise buffer salts and optionally additional acids or bases, such as hydrochloric acid or sodium hydroxide. In some embodiments, buffer additives comprise shielding agents such as proteins, e.g. Bovine Serum Abumin (BSA); viscosity modifying polymers such as poly(vinyl alcohol) (PVA), poly (vinyl pyrrolidone) (PVP), poly(ethylene glycol) (PEG), or oligomers or copolymers thereof; excipients or stabilizing agents such as saccharides (for example, dextran, trehalose, maltodextrose); and surfactants such as non-ionic surfactants (for example, polysorbate 20 or 80, Triton X-100, Triton X-305, or Pluronic F-68).

Buffer salts useful in the buffer solutions described herein include weak acids and bases. The buffer salts may be mono-basic, di-basic, tri-basic, or have higher-order basicity, depending on how many protons the buffer salt can accept. For example, a mono-basic buffer salt will be able to accept one proton, whereas a di-basic buffer salt can accept two protons. Similarly, acids useful in the buffer solutions described herein can be mono-protic, di-protic, tri-protic, and so on, depending on how many protons they can donate.

The term "Surfactant" are compounds that lower the surface tension (or interfacial tension) between two liquids, between a gas and a liquid, or between a liquid and a solid. Surfactants may act as detergents, wetting agents, emulsifiers, foaming agents, or dispersants.

The term "Non-ionic surfactants" are surfactants that have polar head groups that are not electrically charged. The substance does not act as good Bronsted acid but provides decent solubility in polar solvents. Non-ionic surfactants have covalently bonded oxygen-containing hydrophilic groups, which are bonded to hydrophobic parent structures. The water-solubility of the oxygen groups is the result of hydrogen bonding. Hydrogen bonding decreases with increasing temperature, and the water solubility of non-ionic surfactants therefore decreases with increasing temperature. Examples of non-ionic surfactant are but not limited to ethoxylated and alkoxylated fatty acids, ethoxylated amines, ethoxylated alcohol, alkyl and nonyl-phenol ethoxylates, ethoxylated sorbitol esters, and castor oil ethoxylate and like. The examples of alkylphenol ethoxylates are but not limited to nonoxynols, Triton X-100. Examples of Fatty acids esters of sorbitol are Tween 20, Tween 40, Tween 60, Tween 80, Sorbitan compounds and like.

The term "reagent" is a substance or compound added to a system to cause a chemical reaction or added to test if a reaction occurs.

The term, "reagent buffer" as described herein is a buffer solution utilized in preparing reagents or in applying reagents to the apparatus. In some embodiments, the solution or buffer composition render the test compatible with liquids that may contain an analyte.

A zwitterion is a molecule that contains an equal number of positively charged functional groups and negatively charged functional groups.

The term "zwitterionic sulphonic solution" refers to a member of the class of organosulfur compounds that are zwitterions. The sulphonic group refers to a member of the class of organosulfur compounds with the general formula R—S(=O)2-OH, where R is an organic alkyl or aryl group and the S(=O)2(OH) group a sulfonyl hydroxide. zwitterionic sulphonic solution and zwitterionic sulphonic acid buffering agent are interchangeably used. Examples of zwitterionic sulphonic solution are but not limited to HEPES (4-(2-hydroxyethyl)-1-piperazineethanesulfonic acid), CAPS (N-cyclohexyl-3-aminopropanesulfonic acid), CHES (N-Cyclohexyl-2-aminoethanesulfonic acid), MOPS (3-(N-morpholino)propanesulfonic acid), HEPBS (N-(2-Hydroxyethyl)piperazine-N'-(4-butanesulfonic acid), and like.

The term "pH" is a scale used to specify the acidity or basicity of an aqueous solution. Acidic solutions are measured to have lower pH values than basic or alkaline solutions.

The term "circular dichroism" (CD) is a form of light absorption spectroscopy that measures the difference in absorbance of right- and left-circularly polarized light by a substance.

The term "absorbance peak" is a wavelength where the absorbance reaches a maximum. The wavelengths of absorption peaks can be correlated with the types of bonds in each molecule and are valuable in determining the functional groups within a molecule.

The term "pKa" is the pH value at which a chemical species will accept or donate a proton. The lower the pKa, the stronger the acid and the greater the ability to donate a proton in aqueous solution.

The term "COVID-19" (Coronavirus disease 2019) is a contagious respiratory and vascular disease caused by severe acute respiratory syndrome coronavirus 2 (SARS-CoV-2). First identified in Wuhan, China, it has caused an ongoing pandemic. Common symptoms include fever, cough, fatigue, breathing difficulties, and loss of smell and taste.

The term "False positive" is an error in binary classification in which a test result incorrectly indicates the presence of a condition such as a disease when the disease is not present.

The term "nonspecific" is binding of an antibody to the unintended protein or antigen.

The term "disease" a particular abnormal condition that negatively affects the structure or function of all or part of an organism, and that is not due to any immediate external injury. For example but not limited to influenza, sexually transmitted diseases, COVID-19 and like.

The present invention is described below through various embodiment:

An embodiment of invention relates to a lateral flow immunoassay reagent buffer for a SARS-CoV-2 LFI antigen test, a specific range of a set of chemical compounds that is able to improve the LFI signal intensity and prevent LFI background signal from occurring.

An embodiment of invention relates to a lateral flow immunoassay reagent buffer for rapid infectious disease diagnosis that is comprised of a 100-200 mM concentration of a zwitterionic sulfonic buffer with a pKa range of 6.0-8.0 combined with a 0.5-5% mixture of non-ionic surfactants in a low salt solution at a pH range of 7.0-8.0 with positive circular dichroism absorbance peaks at 190 nm (absorbance between 1.25-1.75) and 225 nm (absorbance between 0.1-0.3) for quality control.

In an embodiment, concentration of the zwitterionic sulphonic solution could be in any range of 100-200 mM, 50-250 mM, 50-150 mM, 150-200 mM, 50-300 mM.

In one embodiment, the soluble buffer with pKa range between 6.0-8.0 is comprised of HEPES(4-(2-hydroxyethyl)-1-piperazineethanesulfonic acid) between the concentrations of 100-200 mM.

In an embodiment, concentration of the non-ionic surfactant is in range with a minimum value equal to 0.1, 0.3, 0.5, 0.7, 1, 1.4, 1.6, 1.8 or 2; and the maximum value equal to 1, 1.5, 2, 2.5, 3, 3.5, 4, 4.5, 5, 6, 7, 8, 9, 10 or more.

In one embodiment, the non-ionic detergent is a combination of Triton X-100 (2-[4-(2,4,4-trimethylpentan-2-yl)phenoxy]ethanol) at a percent concentration of 0.0075-0.25% and Tween 20 (Polyoxyethylene (20) sorbitan monolaurate) at a percent concentration of 0.5%-5%.

In one embodiment, the low salt solution is a phosphate buffered saline.

In one embodiment the reagent buffer comprises of a 150 mM solution of HEPES in phosphate buffered saline with 0.075% concentration Triton X-100 and 1% concentration Tween 20.

In one embodiment the reagent buffer contains preservatives for nucleic acids.

The term, "Preservatives" refers to a chemical compound with a function to ensure sterility of the product throughout the shelf life or period of use of the product. The preservative includes a preservative for at least one of a nucleic acid, a small molecule, or a protein. The preservative reduces bacterial growth and multiplication.

In an embodiment, a nucleic acid preservative includes a member selected from the group consisting of a nuclease inhibitor, an RNase inhibitor, and a protease inhibitor. In some embodiments, the preservative includes a bactericidal or bacteriostatic preservative. In some embodiments, the bacteria preservative includes a member selected from the group consisting of sorbic acid, citric acid, propyl paraben, nisin, dimethyl dicarbonate, ethylenediaminetetraacetic acid (EDTA), sodium azide, hydroxyurea, fusidic acid, diazolidinyl urea, imidazolidinyl urea, salicylic acid, barium and nickle chloride, metallic copper, thimerosal, 2-phenoxyethanol, and ProClin. In some embodiments, the bacteria preservative is sorbic acid, thimerosal, 2-phenoxyethanol, diazolinidyl urea, or imidazolinidyl urea.

In one embodiment, the reagent buffer can function as a means of neutralizing and extracting SARS-CoV-2 protein antigens for lateral flow immunoassay and preserves SARS-CoV-2 RNA for polymerase chain reaction testing.

In another embodiment a reagent buffer for SARS-CoV-2 antigen testing that is comprised of a 100-200 mM concentration of a zwitterionic sulfonic buffer with a pKa range of 6.0-8.0 combined with a 0.5-5% mixture of non-ionic surfactants in a low salt solution at a pH range of 7.0-8.0 with positive circular dichroism absorbance peaks at 190 nm (absorbance between 1.25-1.75) and 225 nm (absorbance between 0.1-0.3) for quality control.

In one embodiment the soluble buffer with pKa range between 6.0-8.0 is comprised of HEPES (4-(2-hydroxyethyl)-1-piperazineethanesulfonic acid) between the concentrations of 200-100 mM.

In one embodiment, the non-ionic detergent is a combination of Triton X-100 (2-[4-(2,4,4-trimethylpentan-2-yl)phenoxy]ethanol) at a percent concentration of 0.0075-0.25% and Tween 20 (Polyoxyethylene (20) sorbitan monolaurate) at a percent concentration of 0.5%-5%.

In one embodiment, the low salt solution is a phosphate buffered saline.

In one embodiment the reagent buffer comprises of a 150 mM solution of HEPES in phosphate buffered saline with 0.075% concentration Triton X-100 and 1% concentration Tween 20.

In one embodiment, the reagent buffer can be applied to downstream diagnostic immunoassays.

In one embodiment, the reagent buffer can function as a means of neutralizing and extracting SARS-CoV-2 protein antigens for downstream immunoassays (i.e. lateral flow immunoassay, etc.) and preserves SARS-CoV-2 RNA for genetic testing (i.e. polymerase chain reaction testing).

In one embodiment, the reagent buffer can extract SARS-CoV-2 antigens from biofluid samples and wastewater where the RNA is degraded but protein antigens still are intact.

In an embodiment, the reagent buffer properly rewet the LFI matrix, visibly flow conjugate beads through the strip, and deliver a diagnostic band within 15 minutes.

In an embodiment, the intensity of signal of the reagent buffer does not interfere or denature the analyte-ligand binding zone.

In an embodiment, the thickness of band of the reagent buffer demonstrate the thickness and darkness of the band for quick and recognition to ensure accuracy by eliminating the faint or wavey lines that may lead to a false negative.

In an embodiment, the reagent buffer shows reduction of background. The reagent buffer hydrate and mobilize the conjugate beads such that they travel through the entire LFI strip and do not immobilize in regions outside of the analyte-ligand binding zones.

WORKING EXAMPLES

The invention is illustrated by the following working examples. The following examples as described are not intended to be construed as limiting the scope of the present invention.

Example 1

Figure 2:
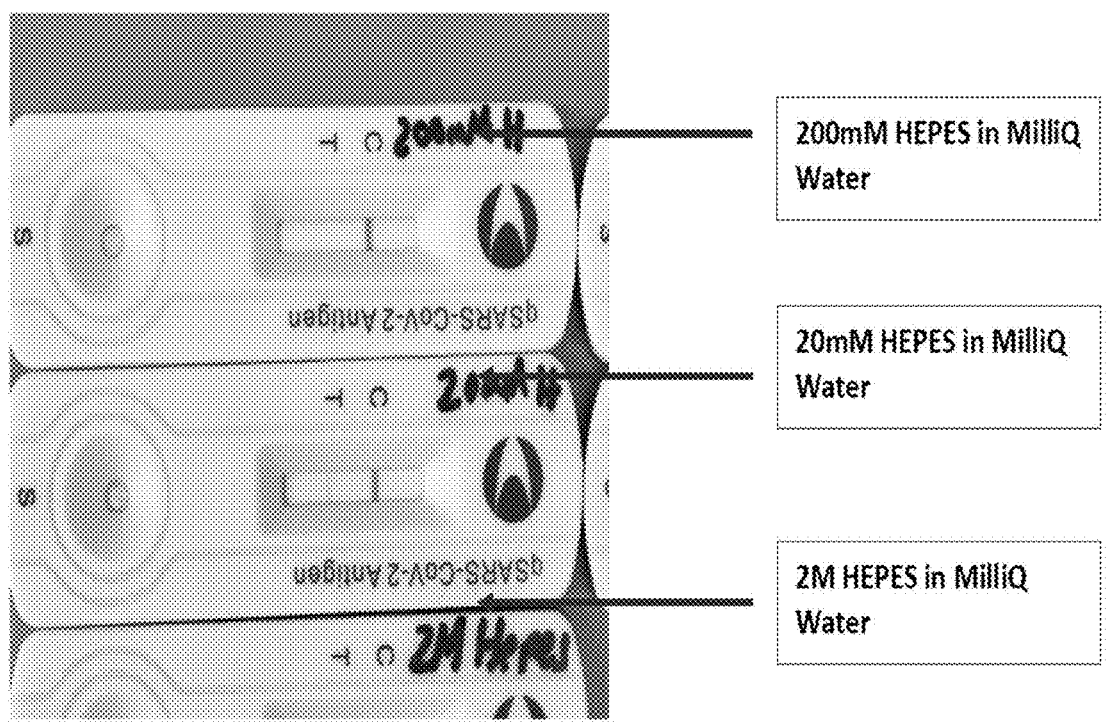
FIG. 2 shows dynamic range of HEPES immunological reactivity in a negative SARS-CoV-2 sample in MilliQ Water. Higher concentration solutions of HEPES (2M) leads to a poor flow rate (slower to flow through LFI strip, <15 minutes) and clarity of signal due to an increase of background concentration (pink background in LFI viewing window). A lower concentration of HEPES (20 mM) leads to a false positive reactivity. A medium concentration (200 mM) of HEPES has improved flow rate (>15 minutes and no pink background) and no non-specific reactivity.
Figure 3:
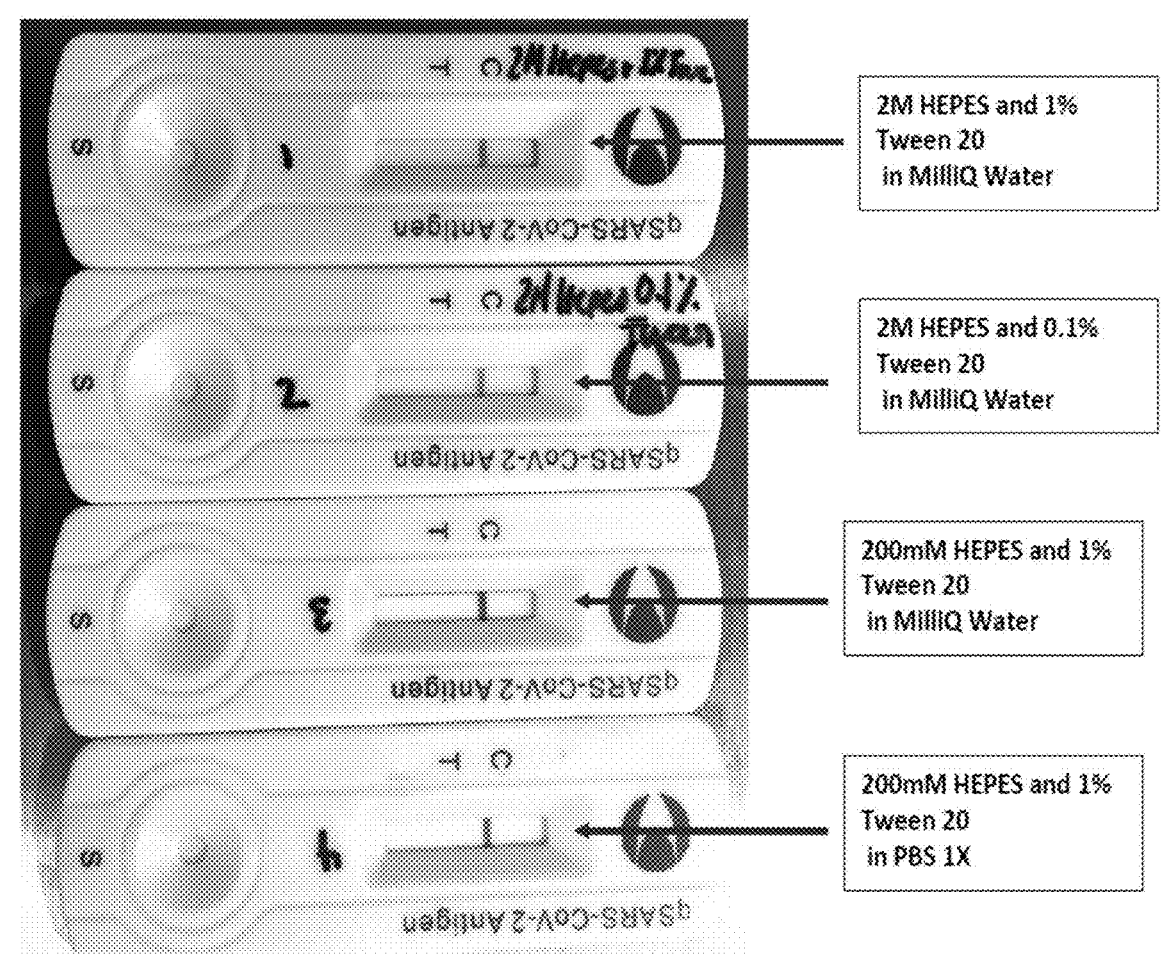

Approximately 120 µL of reagent buffer was loaded onto the predicate SAR-CoV-2 antigen LFI test (Cellex) with and without a heat inactivated SARS-CoV-2 lysate. The test was imaged roughly 15-20 minutes after loading the buffer. FIG. 2 shows that high concentration solutions of HEPES (2M) leads to a poor flow rate (slower to flow through LFI strip) and clarity of signal due to an increase of background concentration. A lower concentration of HEPES (20 mM) leads to a false positive reactivity. A medium concentration (200 mM) of HEPES has improved flow rate and no non-specific reactivity. FIG. 3 shows that HEPES combined with a non-ionic detergent (Tween 20) in phosphate buffer saline yields an improved LFI flow rate. As shown in FIG. 2, higher concentrations of HEPES yield poorer flow rates and LFI clarity (Sample 1), however flow rates can be improved with the addition of the non-ionic detergent (Tween 20) (Sample 2). Despite the improved flow rate at higher concentrations of HEPES, a 200 mM solution of HEPES is a better optimal maximum concentration that has reduced background and improved flow characteristics with or without Tween 20 either in water or low saline solution.

Figure 4:
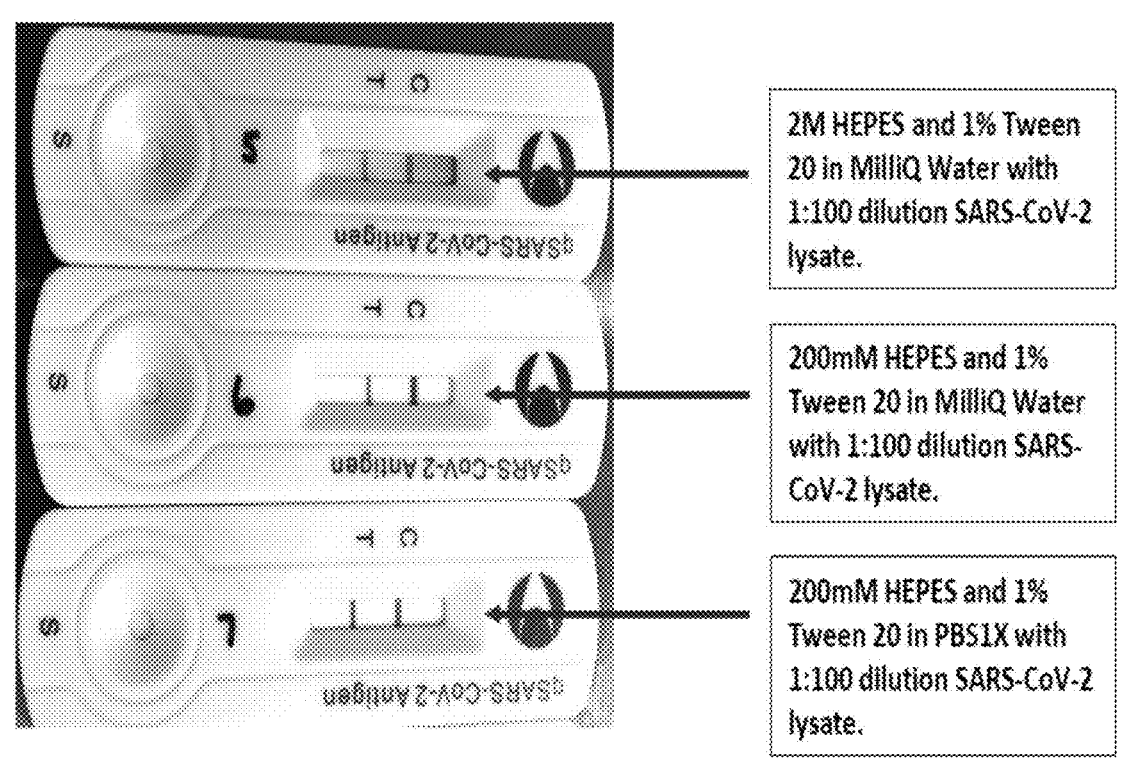
Figure 5:
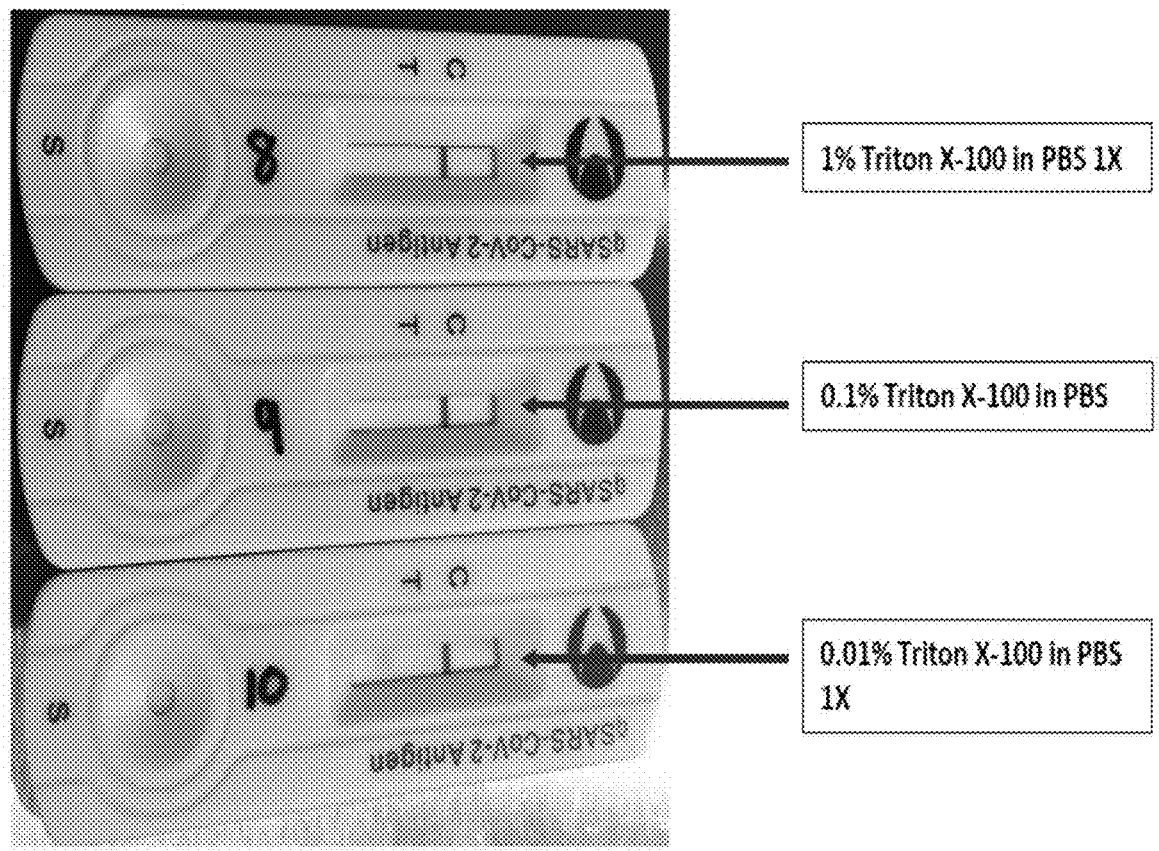
FIG. 5 shows that low concentrations (0.001%) of Triton X-100 interferes with conjugate bead wicking yielding a higher LFI background signal.
Figure 6:
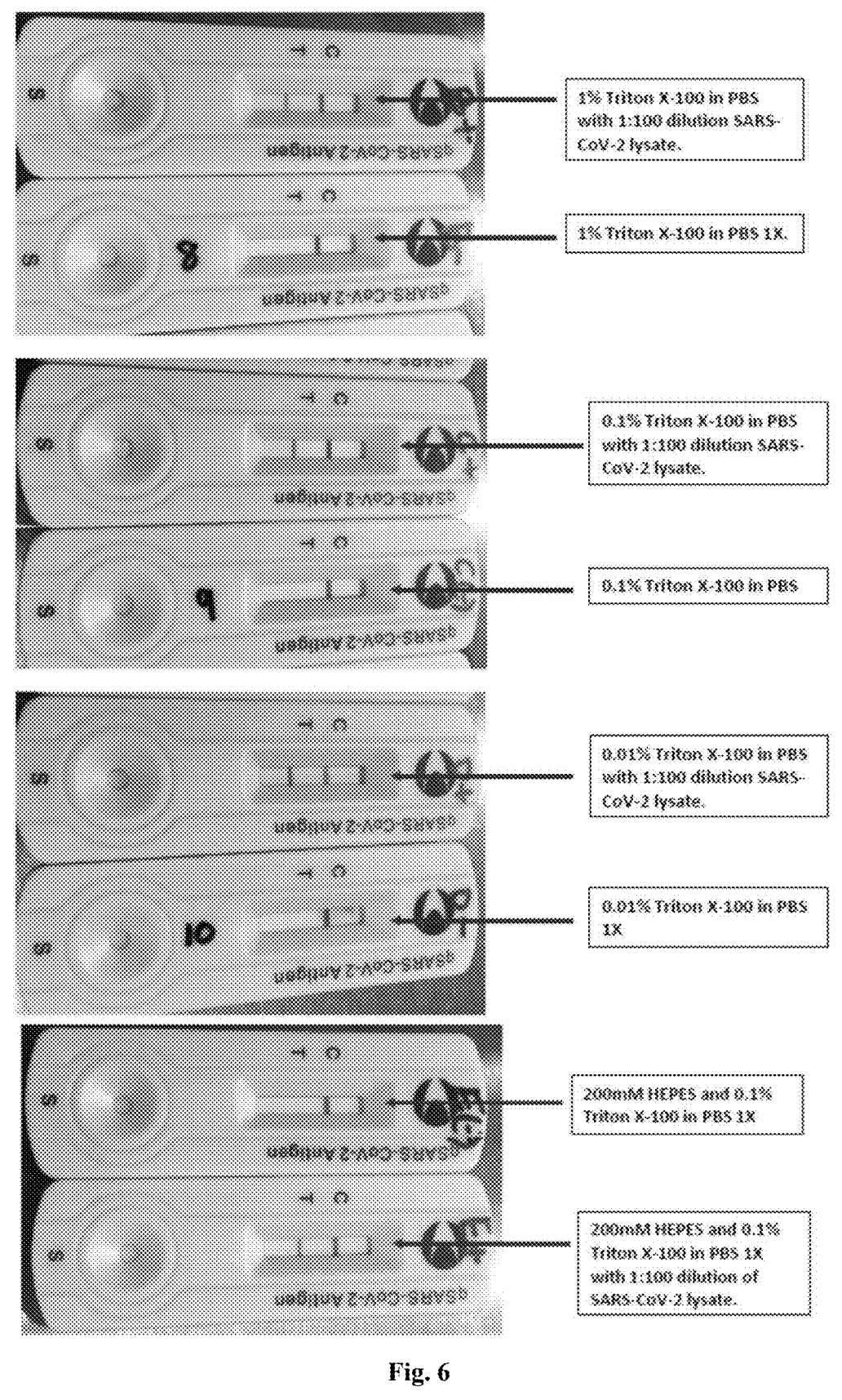

FIG. 4 illustrate positive control testing of reagent buffer mixture. As seen in FIG. 3, 2M HEPES with Tween yields a LFI response with poor wicking and flow rate (Sample 5). Additionally, the test line control band has reduced intensity. Testing with 200 mM HEPES with 1% Tween 20 in water yields a visible band with a faster wicking rate and reduced background (Sample 6), however, with the addition of a saline buffered solution, the test band intensity increases. The band thickness is higher in the solution with PBS added and flowed at the fastest rate of the set (Sample 7). FIG. 5 illustrate that low concentrations (0.001%) of Triton X-100 interferes with conjugate bead wicking yielding a higher LFI background signal. FIG. 6 illustrate that optimized reagent buffer that includes the zwitterionic sulfonic buffer with the non-ionic detergent yields a buffer that has improved flow characteristics, reduced background signal/non-specific binding, and improved band thickness and intensity.

Figure 7:
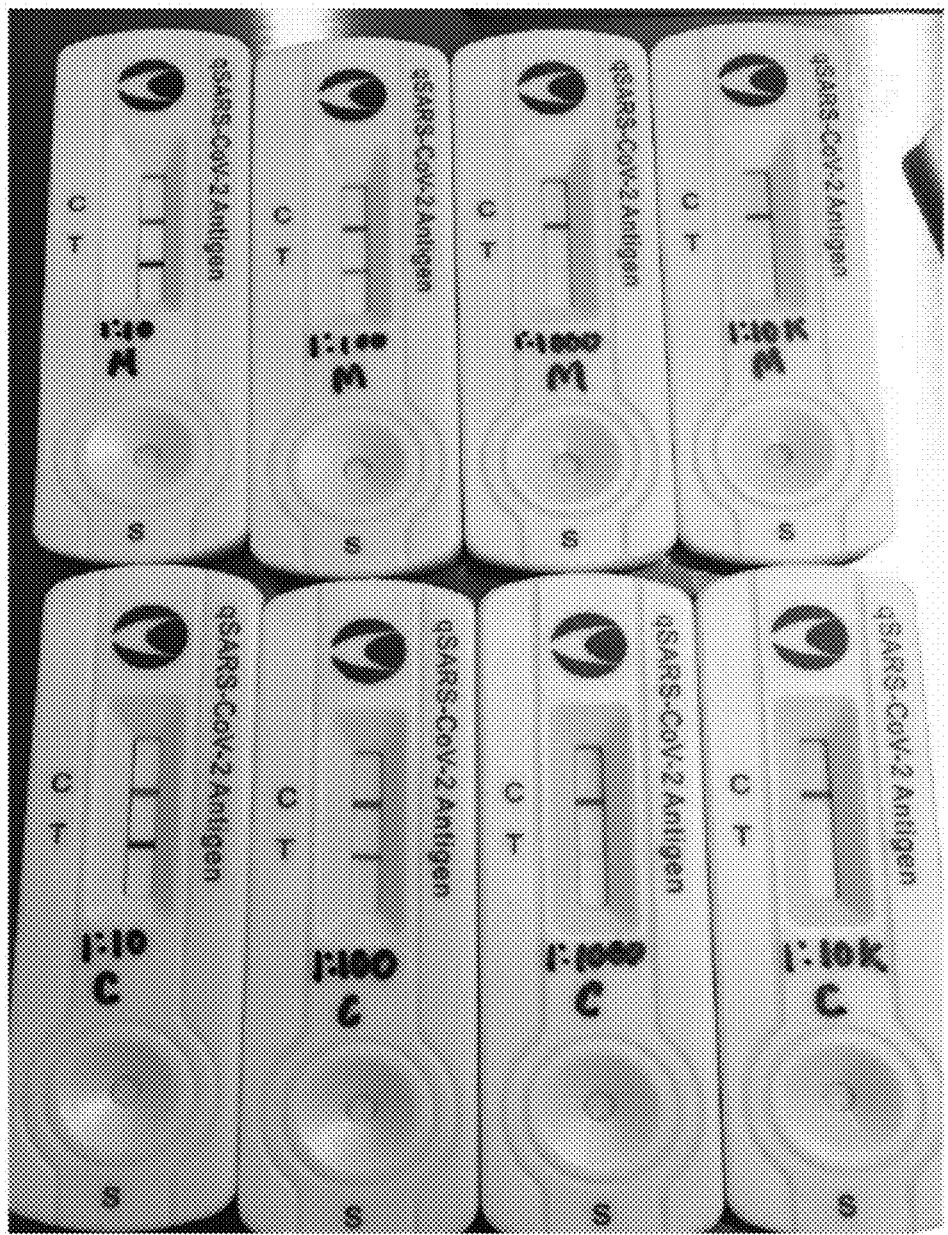
FIG. 7 shows that reagent buffer comparison with predicate SARS-CoV-2 antigen LFI buffer yields the equivalent limit of detection. A reagent buffer (M) was created (200 mM HEPES and 1% Tween 20 in PBS 1×) and mixed with a serial dilution of heat inactivated SARS-CoV-2 lysate. The LFI results were compared with a predicate buffer (C) at the same serial dilution.

FIG. 7 illustrate that reagent buffer comparison with predicate SARS-CoV-2 antigen LFI buffer yields the equivalent limit of detection. A reagent buffer (M) was created (200 mM HEPES and 1% Tween 20 in PBS 1×) and mixed with a serial dilution of heat inactivated SARS-CoV-2 lysate. The LFI results were compared with a predicate buffer (C) at the same serial dilution. Predicate buffer is a commercial propriety that is used in the state of the art for LFI testing.

Figure 8:
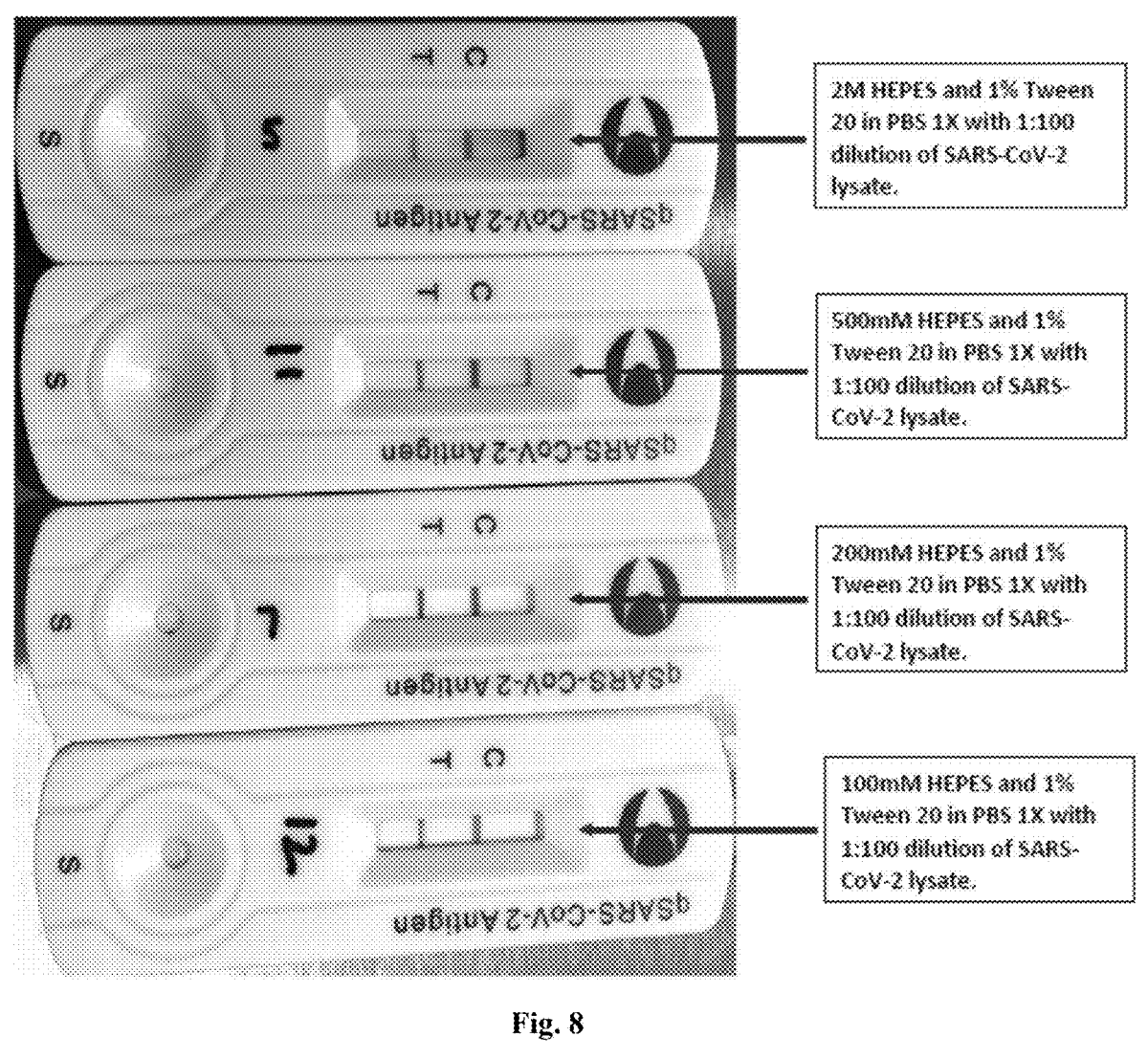

FIG. 8 illustrate the concentration optimization of the zwitterionic sulfonic buffer. High concentrations of HEPES (500 mM-2M) damages the LFI to have poor wicking, increased background signal, and diminished positive test band thickness and intensity (2M HEPES). Low concentrations of HEPES (>100 mM) additionally, yields increased background signal. Therefore, the zwitterionic buffer component of the reagent buffer has an optimal LFI SARS-CoV-2 antigen testing.

FIG. 9 illustrate that the combination of a zwitterionic buffer with surfactant Triton X-100 demonstrates the narrow range for optimal LFI reagent buffer qualities. A 150 mM concentration of HEPES in PBS 1× was determined to be the best concentration between the determined ranges of 100-200 mM (above). The addition of the surfactant Triton X-100 at 0.75% demonstrated slow fluid flow wicking and poor conjugate bead mobilization, however lowering the concentration 10-fold led to an increased fluid flow rate and improved background signal. Running a positive control sample with the SARS-CoV-2 lysate had minimal background signal, but the test line band intensity and thickness was reduced. On the other hand, lowering the concentration of Triton X-100 by 100-fold has increased the non-specific background signal and narrow the band thickness.

Figure 10:
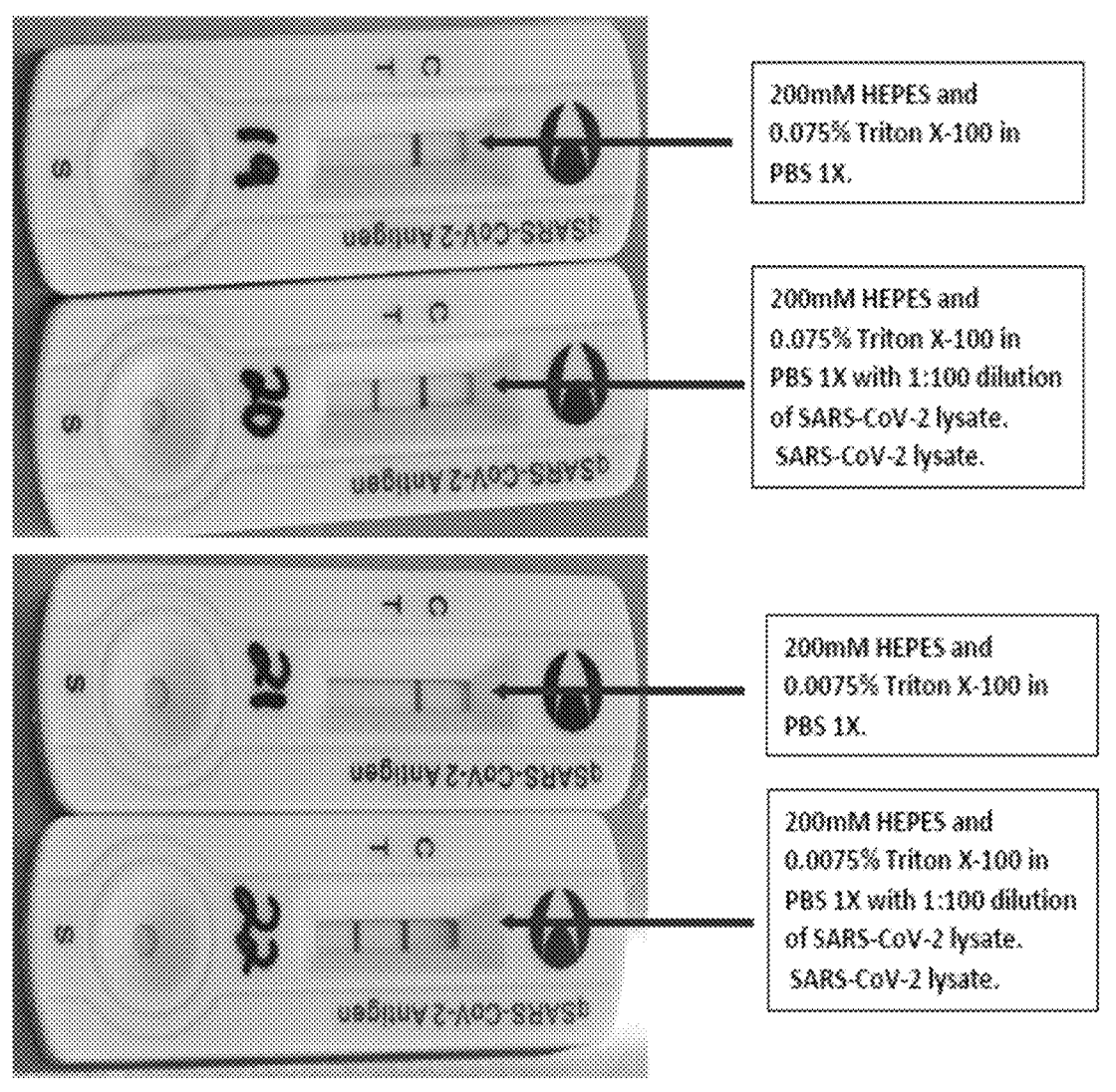

FIG. 10 illustrate that an increase of HEPES concentration at 200 mM with surfactant Triton X-100 at 0.075% in PBS 1× showed a lighter band with a clear background. However, lowering the concentration of surfactant Triton X-100 10-fold led to increased non-specific background signals and narrow band thickness.

Figures 11, 12:
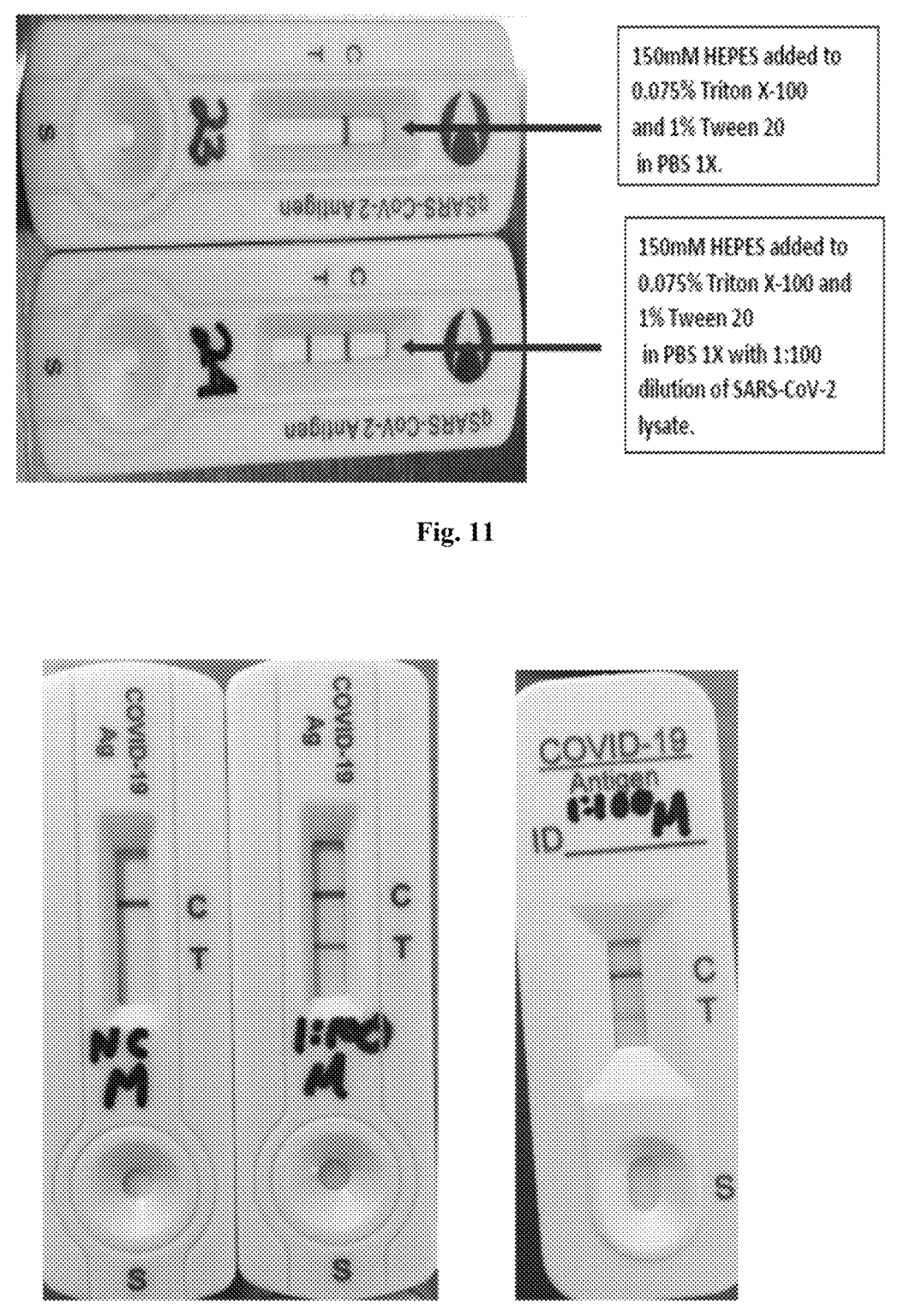

FIG. 11 illustrate that a combination of a zwitterionic buffer of 150 mM HEPES with 0.075% of surfactant Triton X-100 and 1% of non-ionic detergent (Tween 20) in phosphate buffer saline 1X demonstrates the acceptable LFI flow rate (sped up bead mobilization), reduced non-specific background signals, and improved band thickness and intensity. Accordingly, a positive control sample with the SARS-CoV-2 lysate has shown an optimal LFI SARS-CoV-2 antigen testing.

Reagent Buffer of present invention can be applied to other SARS-CoV-2 antigen LFIs as illustrated in FIG. 12.

Methods: Approximately 120 µL of reagent buffer of present invention was loaded onto the predicate SAR-CoV-2 antigen LFI test (Helagen, left and LumiQuick, right) with and without a heat inactivated 1:100 dilution of SARS-CoV-2 lysate. The test was imaged roughly 15-20 minutes after loading the Reagent Buffer of present invention. The Helagen SARS-COV-2 antigen test (left, "COVID-19 Ag") shows good flow, clarity of signal, and strong band intensity at a 1:100 dilution of COVID-19 lysate with the Reagent Buffer of this invention. A negative control sample of just the Reagent Buffer also demonstrates good flow, clarity of signal, no false positives, and strong control band intensity. The LumiQuick SARS-COV-2 antigen test (right, "COVID-19 Antigen") shows good flow and clarity of signal, however the band intensity is reduced at a 1:100 dilution of COVID-19 lysate with the Reagent Buffer of present invention. Overall the Reagent buffer according to present invention is compatible with other LFI testing formats and demonstrates equivalent or superior reagent buffer for antigen testing.

Figure 13:

FIG. 13 illustrate that the Reagent Buffer Mixture comparison with predicate SARS-CoV-2 antigen LFI buffer yields equivalent analytical sensitivity. A reagent buffer (M) was created (150 mM HEPES, 0.075% Triton X-100, and 1% Tween 20 in PBS 1×) and mixed with a serial dilution of heat inactivated SARS-CoV-2 lysate. The LFI results were compared with a predicate buffer (C) at the same serial dilution.

Figure 14:
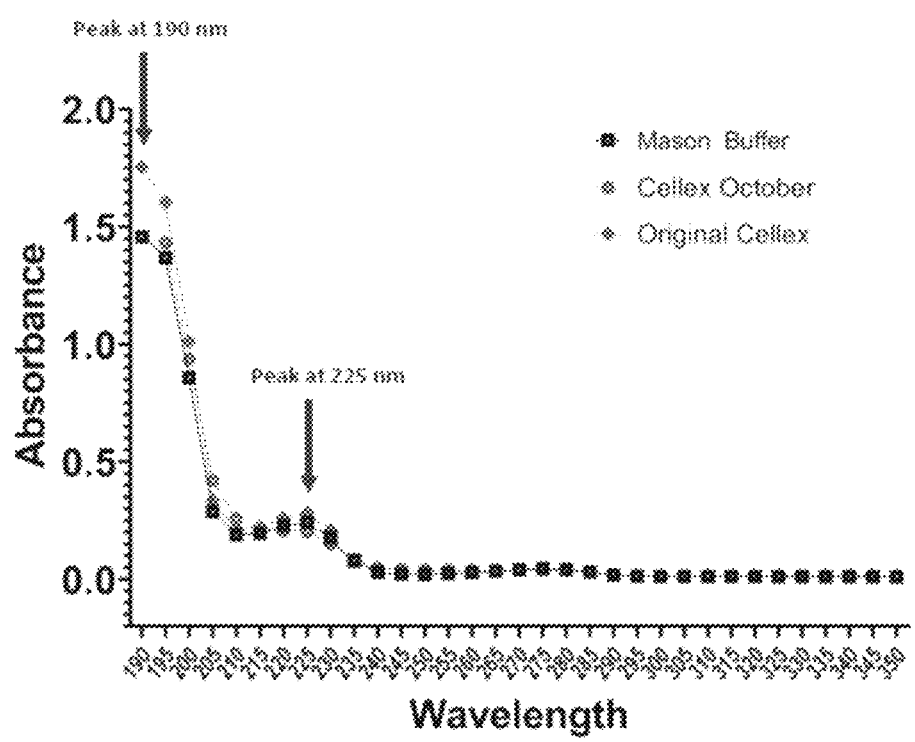

FIG. 14 illustrate that circular dichroism spectroscopy readings of the Reagent Buffer compared to predicate SARS-CoV-2 antigen LFI Reagent Buffer demonstrates full equivalence. An average of N=3 runs per buffer yield an equivalence between the predicate and Mason Reagent buffer. This technology can be used as a quality assurance/quality control method of validating the mixed buffer.

Test Methodology

We analyzed various buffer compositions against 3 major categories to determine the optimal reagent buffer mixture for COVID-19 antigen LFI testing. The categories include:

Flow Rate: Flow rate is estimated by a speed to answer. Speed to answer: The reagent buffer must properly rewet the LFI matrix, visibly flow conjugate beads through the strip, and deliver a diagnostic band within 15 minutes. Completion of the diagnostic test occurs when the conjugate beads have reached the control band or after 15 minutes. Speed to Answer was analyzed by timing the application of the buffer to the LFI and monitoring the duration with which the buffer rewetted the matrix and fully wicked the conjugate beads through the matrix. Poor speed to answer was categorized as reagent buffers which failed to rewet or fully mobilize the conjugate beads through the LFI matrix within the 15 minutes diagnostic window or buffer which did not demonstrate a uniform front of buffer flow across the width of the strip.

Band Appearance: It was evaluated based on Intensity of signal and band thickness.

Intensity of Signal: The reagent buffer must not interfere or denature the analyte-ligand binding zone. Intensity of signal was referred against a control, standard in the field, predicate, proprietary reagent buffer (composition unknown) for a given LFI antigen test by visual inspection and densitometric analysis.

For a standard unit amount of analyte, a reagent buffer was compared against a predicate buffer with the same unit of analyte. We examined the relative difference in the intensity or darkness of color at the test or control bands/line between the experimental and predicate buffers. Furthermore we examined if the intensity of band signal at the lowest limit of detection for the predicate buffer compared to the test buffers. Buffers with which demonstrated increased band intensity (i.e. more sensitive in detection of added analyte) compared to the predicate buffer were considered good.

Thickness of Band: The reagent buffer must demonstrate the thickness and darkness of the band for quick and recognition to ensure accuracy by eliminating the faint or wavey lines that may lead to a false negative Clarity of Signal: It is evaluated based on reduction of background signal.

Reduction of Background: The reagent buffer must hydrate and mobilize the conjugate beads such that they travel through the entire LFI strip and do not immobilize in regions outside of the analyte-ligand binding zones. Reduction of background was determined by visual inspection to determine areas with which the conjugate beads should not immobilize (non-specific pink background/immobilized beads in the LFI viewing window) combined with quantitative densitometry analysis of the background intensity of the LFI viewing window (excluding the test and control bands).

Furthermore, good conjugate bead mobilization can be defined as the absence of conjugate bead color prior to or downstream of the test window. Poor bead mobilization can be defined as conjugate bead color that does not traverse the strip to reach the control line at the end of the test or bead color which is immobilized in regions of the strip outside of the test and control bands.

Clarity of signal is the difference between the color intensity of the white matrix around the test line compared to the test line itself. An ideal clarity of signal is a complete white background surrounding the colored test or control band/line. We examined the difference between the test and control band lines to the matrix within the viewing window. Higher or good clarity of signal are buffers which maximize the sensitivity of detection by preventing conjugate bead immobilization in regions outside of the test or control bands.

What is claimed is:

1. A reagent buffer, comprising:
   (a) zwitterionic sulfonic solution,
   (b) a non-ionic surfactant solution, comprising a first non-ionic surfactant and a second non-ionic surfactant, wherein the non-ionic surfactant solution is in an amount more than 1% v/v and less than 5% v/v of a total amount of the reagent buffer, and
   (c) a buffer solution,
   wherein the reagent buffer has a pH range of about 7.0 to about 8.0 and a circular dichroism with a first absorbance peak more than zero at 190 nm and a second absorbance peak more than zero at 225 nm.

2. The reagent buffer of claim 1, wherein the zwitterionic sulfonic solution has a concentration of about 100 mM to about 200 mM with a pKa range of about 6.0 to about 8.0.

3. The reagent buffer of claim 1, wherein the zwitterionic sulfonic solution comprises HEPES.

4. The reagent buffer of claim 1, wherein the first absorbance peak at 190 nm is between about 1.25 to about 1.75 and the second absorbance peak at 225 nm is between about 0.1 to about 0.3.

5. The reagent buffer of claim 1, wherein the reagent buffer is a sample buffer for a lateral flow immunoassay.

6. The reagent buffer of claim 5, wherein the reagent buffer is configured to detect disease.

7. The reagent buffer of claim 6, wherein the reagent buffer further comprises a preservative.

8. A method comprising (1) adding a lysate on a lateral flow immunoassay (2) loading a reagent buffer comprising a zwitterionic sulfonic solution, a non-ionic surfactant solution, and a buffer solution, wherein the reagent buffer has a pH range of about 7.0 to about 8.0 and a circular dichroism with a first absorbance peak more than 0 at 190 nm and a second absorbance peak more than zero at 225 nm, in the lateral flow immunoassay, and (3) testing a presence of SARS-CoV-2.

9. The method of claim 8, wherein the lysate comprises a heat inactivated antigen.

10. The method of claim 8, wherein the lysate comprises without heat inactivated antigen.

11. The method of claim 8, wherein a result of the presence of SARS-CoV-2 is configured in less than 20 minutes from a time of the addition of the lysate on to the lateral flow immunoassay.

12. The reagent buffer claim 1, wherein the first non-ionic surfactant comprises an alkylphenol ethoxylate, and the second non-ionic surfactant comprises a polysorbate.

13. The reagent buffer of claim 12, wherein the alkylphenol ethoxylate comprises TritonX-100; and the polysorbate comprises Tween-20.

14. The reagent buffer of claim 12, wherein the alkylphenol ethoxylate is in a percent concentration of 0.0075 v/v % to 0.25 v/v % of the total amount of the reagent buffer.

15. The reagent buffer of claim 13, wherein TritonX-100 is in a percentage concentration of 0.0075 v/v % to 0.25 v/v % of the total amount of the reagent buffer.

16. The reagent buffer of claim 1, wherein the buffer solution comprises a phosphate buffer.

17. The reagent buffer of claim 1, wherein the reagent buffer is compatible with a solution containing an analyte comprising one or more biological molecules.

18. The reagent buffer of claim 17, wherein the one or more biological molecules comprises one or more lysate to detect one or more diseases.

19. The reagent buffer of claim 6, wherein the disease comprises COVID-19, influenza, or a sexually transmitted disease.

20. The reagent buffer of claim 18, wherein the one or more lysate for the disease comprises a heat inactivated antigen.

21. The method of claim 18, wherein the one or more lysate for the disease comprises a non-heat inactivated antigen.

22. A reagent buffer, comprising:
(a) a zwitterionic sulfonic solution,
(b) a non-ionic surfactant solution, comprising an alkylphenol ethoxylate and a polysorbate, wherein the alkylphenol ethoxylate is at a percent concentration of 0.0075 v/v % to 0.25 v/v % of a total amount of the reagent buffer and the polysorbate at a percent concentration of 0.5 v/v % to 5 v/v % of the total amount of the reagent buffer, such that the non-ionic surfactant solution is in a ratio of more than 1% v/v and less than 5% v/v of the total amount of the reagent buffer,
(c) a buffer solution,
wherein the reagent buffer has a pH range of about 7.0 to about 8.0 and a circular dichroism with a first absorbance peak more than zero at 190 nm and a second absorbance peak more than zero at 225 nm.

23. The reagent buffer of claim 22, wherein the alkylphenol ethoxylate comprising TritonX-100 at a percent concentration of 0.0075 v/v % to 0.25 v/v % of the total amount of the reagent buffer.

24. The reagent buffer of claim 22, wherein the zwitterionic sulfonic solution comprises HEPES, and the buffer solution comprises a phosphate buffer.

25. The reagent buffer of claim 22, wherein the reagent buffer is compatible with a solution containing an analyte comprising one or more biological molecules.

26. The reagent buffer of claim 25, wherein the one or more biological molecules comprises one or more lysate to detect one or more diseases.

27. The reagent buffer of claim 26, wherein one or more diseases comprises COVID-19, influenza, or a sexually transmitted disease.

* * * * *